US012063723B2

(12) United States Patent
Valorge et al.

(10) Patent No.: US 12,063,723 B2
(45) Date of Patent: Aug. 13, 2024

(54) DEVICE AND METHOD FOR CONTROLLING A SET OF LIGHT SOURCES FOR A MOTOR VEHICLE LIGHT ASSEMBLY

(71) Applicant: VALEO VISION, Bobigny (FR)

(72) Inventors: Olivier Valorge, Bobigny (FR); Thomas Giraud-Sauveur, Bobigny (FR); Marjaneh Kazemi, Bobigny (FR); Guillaume Zante, Bobigny (FR)

(73) Assignee: VALEO VISION, Bobigny (FR)

( * ) Notice: Subject to any disclaimer, the term of this patent is extended or adjusted under 35 U.S.C. 154(b) by 166 days.

(21) Appl. No.: 17/623,116

(22) PCT Filed: Jun. 29, 2020

(86) PCT No.: PCT/EP2020/068308
§ 371 (c)(1),
(2) Date: Dec. 27, 2021

(87) PCT Pub. No.: WO2020/260718
PCT Pub. Date: Dec. 30, 2020

(65) Prior Publication Data
US 2022/0264714 A1 Aug. 18, 2022

(30) Foreign Application Priority Data
Jun. 28, 2019 (FR) ....................................... 1907119

(51) Int. Cl.
*H05B 45/18* (2020.01)
*F21S 41/153* (2018.01)
(Continued)

(52) U.S. Cl.
CPC ............ *H05B 45/18* (2020.01); *F21S 41/153* (2018.01); *F21S 43/15* (2018.01); *H05B 45/325* (2020.01); *H05B 45/46* (2020.01); *F21Y 2115/10* (2016.08)

(58) Field of Classification Search
CPC ...... H05B 45/18; H05B 45/325; H05B 45/46; H05B 45/44; F21S 41/153; F21S 43/15; F21Y 2115/10
(Continued)

(56) References Cited

U.S. PATENT DOCUMENTS 7,067,995 B2 * 6/2006 Gunter .................. H05B 45/40 345/83
8,708,560 B2 * 4/2014 Kraemer ............... H05B 45/22 374/162
(Continued)

FOREIGN PATENT DOCUMENTS

CN 101155450 A 4/2008
CN 101292574 A 10/2008
(Continued)

OTHER PUBLICATIONS

International Search Report issued Jul. 22, 200 in PCT/EP2020/068308, filed Jun. 29, 2020, 3 pages.
(Continued)

*Primary Examiner* — Ryan Jager
(74) *Attorney, Agent, or Firm* — Oblon, McClelland, Maier & Neustadt, L.L.P.

(57) ABSTRACT

The invention concerns a motor vehicle light assembly comprising a pixelated light emitting diode designed to project, from the motor vehicle, a predefined image, and a device for controlling the pixelated light emitting diode, the pixelated light-emitting diode comprising a plurality of elementary diodes supplied with a common DC current and
(Continued)

Figure 1:
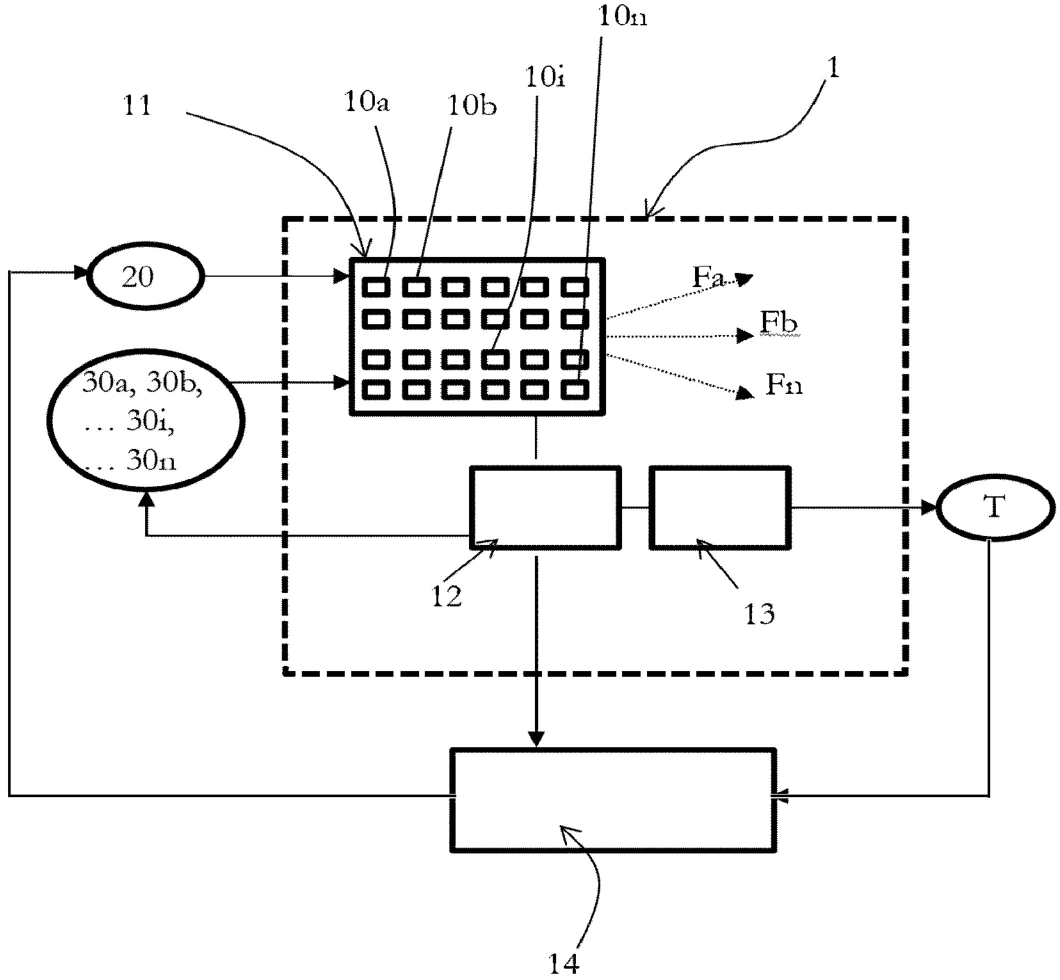

respectively driven by a pulse-width modulation signal of the supply common DC current, the pixelated light-emitting diode comprising a temperature sensor, and the control device being configured to modify the pulse-width modulation signal depending on a temperature of the pixelated light emitting diode and/or of one or more elementary diodes.

15 Claims, 6 Drawing Sheets

(51) Int. Cl.

| | |
|---|---|
| ***F21S 43/15*** | (2018.01) |
| ***H05B 45/325*** | (2020.01) |
| ***H05B 45/46*** | (2020.01) |
| *F21Y 115/10* | (2016.01) |

(58) Field of Classification Search

USPC .......................................................... 315/309

See application file for complete search history.

(56) References Cited

U.S. PATENT DOCUMENTS

| | | | | |
|---|---|---|---|---|
| 9,894,733 | B1 * | 2/2018 | Buthker | H05B 45/48 |
| 2003/0214242 | A1 | 11/2003 | Berg-Johansen | |
| 2007/0108843 | A1 * | 5/2007 | Preston | H05B 45/54<br>307/112 |
| 2009/0091265 | A1 | 4/2009 | Song et al. | |

FOREIGN PATENT DOCUMENTS

| | | | |
|---|---|---|---|
| CN | 103024987 | A | 4/2013 |
| CN | 203072209 | U | 7/2013 |
| CN | 105191498 | A | 12/2015 |

OTHER PUBLICATIONS

Office Action issued Jul. 27, 2023 in Chinese Patent Application No. 202080047628.0 with English translation, 12 pages.

* cited by examiner

Fig.4b
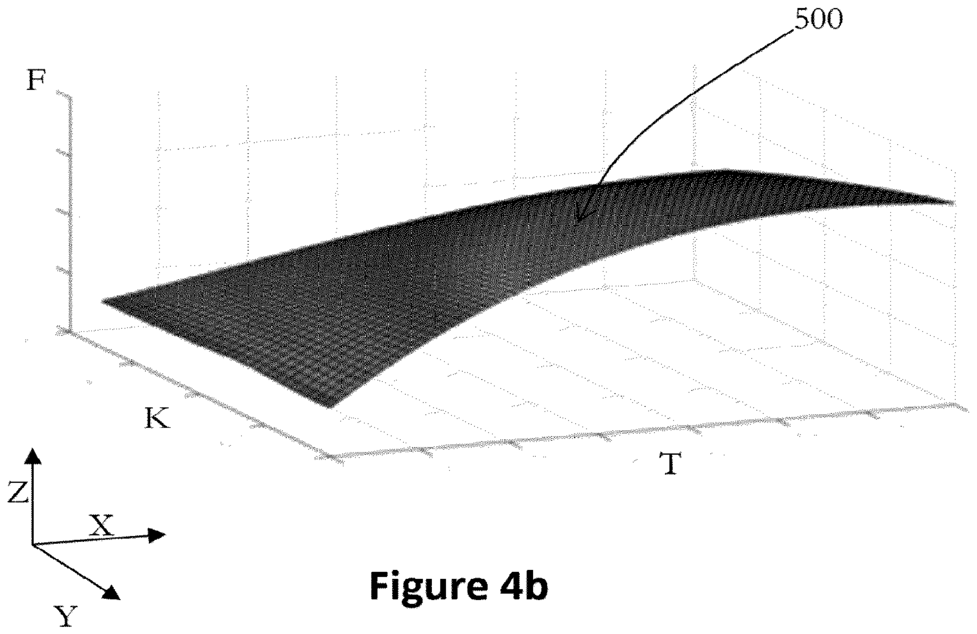
Figure 4b
Fig.5a
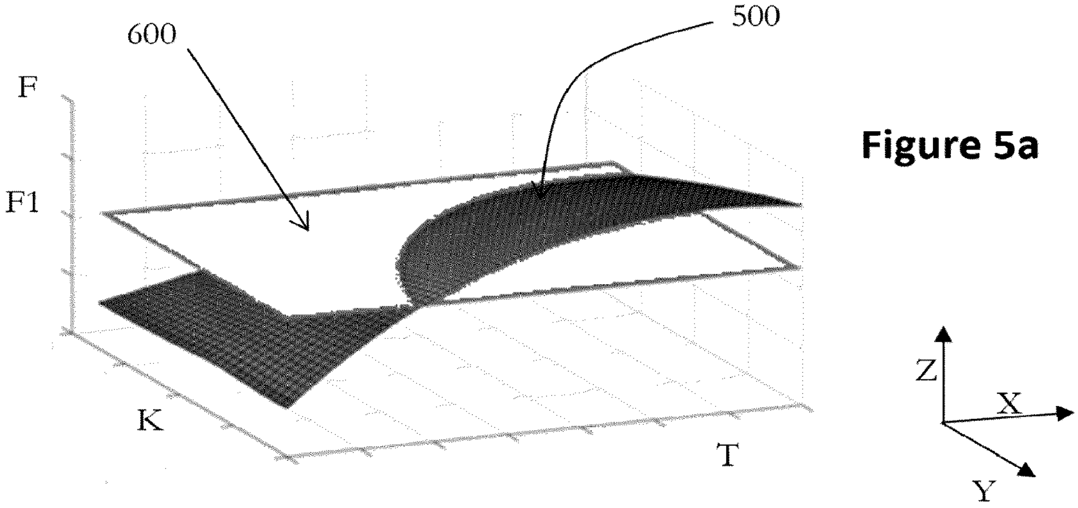
Figure 5a

DEVICE AND METHOD FOR CONTROLLING A SET OF LIGHT SOURCES FOR A MOTOR VEHICLE LIGHT ASSEMBLY

The invention relates to the field of lighting and signaling for motor vehicles. It is preferably applied in lighting assemblies implementing light-emitting diodes for such lighting.

The use of light-emitting diodes, also referred to by the abbreviation LED hereinafter, is becoming increasingly widespread in the field of lighting and signaling for motor vehicles, due both to the low consumption and the long service life of these sources and to their ease and flexibility of implementation. In addition, by virtue of their small size, a number of such light sources may be combined to form a complex lighting surface, opening up new lighting and signaling possibilities for vehicles. It is thus possible to combine a plurality of light-emitting diodes to form a predefined light pattern, or light image, each of the LEDs forming such a pattern being able to be controlled independently so as to form a complex light image comprising, for example, regions of different light intensities. Such sets of LEDs are also called pixelated light-emitting diode, each LED of the set, or elementary diode, forming for example a pixel of the abovementioned complex light image.

Such elementary diodes may be placed on a support and controlled by an associated electronic device. For example, a chip performs pulse width modulation-based driving of a common DC supply current so as to generate, for each of the elementary diodes, an individual signal for controlling the emission of a luminous flux. The set of individual luminous fluxes emitted by the elementary diodes then forms the light image projected by the pixelated light-emitting diode that these elementary diodes form together. For example, the projected image may be a regulated light beam, the shape and intensity of which allows optimum illumination of the roadway in front of the vehicle. However, the ease and flexibility of implementation of light-emitting diodes also makes it possible to produce any other form of light image able for example to provide vehicle driving assistance (warning lights, etc.).

When the elementary diodes are operating, their activation generates a temperature increase, which has the effect of increasing the intensity of the luminous flux at the output of these diodes, and therefore of further increasing the temperature, possibly resulting in a modification of the image projected by the pixelated light-emitting diode, and also, in addition, a reduction in the service life of the elementary diodes. In some cases, the overall light intensity of the image projected by the pixelated light-emitting diode may increase, leading to a risk of dazzling the driver of an oncoming vehicle on the roadway. In other cases, since the heating of the elementary diodes is not homogeneous, the image projected by the pixelated light-emitting diode as defined above may be deformed.

To limit these drawbacks, a temperature sensor may be installed and configured so as to measure a temperature of the pixelated light-emitting diode and to transmit this information to a control unit thereof. In pixelated light-emitting diodes as known from the prior art, the temperature of the pixelated light-emitting diode is transmitted to such a control unit, which is configured so as to modify the common DC supply current outlined above on the basis of this temperature. However, such driving is relatively inaccurate and exhibits low sensitivity.

The technical problem to which the present invention proposes to provide a solution is that of managing, on the basis of the temperature, the evolution of the luminous fluxes emitted by pixelated diodes as have just been defined, and the invention aims to propose a motor vehicle lighting assembly comprising a device and a method for controlling such a set of light-emitting diode light sources on the basis of the temperature.

To achieve its aim, one subject of the invention, according to a first aspect, is a motor vehicle lighting assembly comprising a pixelated light-emitting diode intended to project a predefined image from the motor vehicle, and a control device for controlling said pixelated light-emitting diode, the pixelated light-emitting diode comprising a plurality of elementary diodes supplied by a common DC current and respectively driven by a pulse width modulation signal of the common DC current, the pixelated light-emitting diode comprising a temperature sensor, and the control device being configured so as to modify the pulse width modulation signal on the basis of a temperature of the pixelated light-emitting diode and/or of one or more elementary diodes.

A pixelated light-emitting diode is understood here to mean a light-emitting assembly formed of a plurality of LED elementary light sources, also referred to as elementary diodes or elementary LEDs hereinafter, supplied by one and the same DC electric current, and configured so as to project together, from the motor vehicle equipped therewith, a complex light pattern. Advantageously, the luminous flux emitted by each elementary diode of the pixelated light-emitting diode is controlled individually based on the abovementioned common supply current and based on a pulse width modulation signal, the invention making provision to modify such a signal, or primary signal, on the basis of a measurement of the operating temperature of one or more of the elementary diodes, or even of the entire pixelated diode, in order to obtain a secondary pulse width modulation signal that takes account of this temperature in order to optimize the general emission flux at the output of the device for emitting the predefined image.

It will be understood that the secondary signals are configured, in the same way as the primary signals, so as to chop the common DC supply current so as to drive the supply voltage across the terminals of the elementary diodes of the pixelated light-emitting diode, the secondary signals consisting of the primary signals modified by taking into account a coefficient corresponding to the modification of a temperature with respect to a standard temperature.

Such driving is implemented within a control device for controlling the pixelated light-emitting diode, such as the one proposed by the invention. It will be understood that a variation of the supply current to an elementary diode involves a corresponding variation of the intensity of the luminous flux emitted by this elementary diode. Each elementary diode thus behaves like a pixel of the complex light pattern, or image, that the pixelated light-emitting diode, formed by the set of abovementioned elementary diodes, contributes to projecting. The image projected by the pixelated light-emitting diode is therefore created by the set of luminous fluxes emitted by each elementary diode of the pixelated light-emitting diode.

Advantageously, the pixelated light-emitting diode comprises a temperature sensor. According to one exemplary embodiment, such a temperature sensor is installed on at least one support on which elementary diodes of the pixelated light-emitting diode are arranged.

It thus advantageously measures an average temperature of such a support and of the elementary diodes that are placed thereon. According to another exemplary embodiment, a temperature sensor may be associated with each elementary diode, by being integrated into the elementary diode, or else by being adhesively bonded to the support as close as possible to the elementary diode under consideration, thus providing specific temperature information for the elementary diode under consideration, and not an average temperature of the pixelated diode.

According to the invention, the control device for controlling such a pixelated light-emitting diode is configured so as to control the pulse width modulation signal-based driving on the basis of a temperature of the pixelated light-emitting diode or, more precisely, on the basis of a temperature measured by one or more temperature sensors as mentioned above.

The invention therefore makes provision for it to be a variation of the pulse width modulation signal, and not that of the intensity of the common DC current, that is implemented in order to vary the intensity of the luminous flux emitted individually by each elementary diode on the basis of a temperature, measured by the temperature sensor defined above, of the whole pixelated light-emitting diode.

The regulation of the intensity of the emitted luminous flux resulting from the above, specifically via a regulation via modifying the pulse width modulation setpoint, is finer than that which would result from modifying the voltage of the DC supply current. By way of example, the fineness of a regulation of a voltage of the order of 3 to 4 volts of a DC supply current is of the order of 4 millivolts, while a variation of the pulse width modulation signal may have a step of 1 in $2^{16}$, for a resolution of 16 bits.

According to various features, taken individually or in combination:

- the control device according to the invention is configured so as to apply a predefined multiplying coefficient to the pulse width modulation signals individually driving the emission of luminous fluxes by each elementary diode. According to one exemplary embodiment of the invention, the same multiplying coefficient is applied to the pulse width modulation signals individually driving the emission of luminous fluxes by each elementary diode of the pixelated light-emitting diode. According to another exemplary embodiment, various multiplying coefficients may be applied to various groups of elementary diodes, for example to elementary diodes located in various regions of the pixelated light-emitting diode. By way of non-exclusive example, various multiplying coefficients may be applied to the pulse width modulation signals driving the emission of the luminous fluxes emitted by various elementary diodes depending on whether these are intended to emit very high or, conversely, very low luminous fluxes, in order to adjust a contrast of the projected image on the basis of the temperature of the pixelated light-emitting diode.
- the control device comprises a storage module for storing a database of luminous fluxes emitted by the elementary diodes of the pixelated light-emitting diode at various temperatures, for various multiplying coefficients. According to one example, such a database is established by calibrating the luminous flux emitted individually, for a fixed predefined common DC supply current, by each elementary diode at various temperatures, for a predefined set of multiplying coefficients. According to various variants, the abovementioned luminous flux may be considered in terms of absolute value, or it may be normalized, for example with respect to a maximum value defined beforehand. In other words, the abovementioned database comprises a set of charts of luminous fluxes emitted at various temperatures of the pixelated light-emitting diode and for various predefined multiplying coefficients. Such a database therefore makes it possible, for a measured temperature of the pixelated light-emitting diode, on the one hand, to ascertain the luminous flux emitted by a given elementary diode for a given multiplying coefficient, or, on the other hand, to define the multiplying coefficient to be applied to the pulse width modulation signal driving the emission of a luminous flux by the elementary diode under consideration such that said elementary diode emits a predefined luminous flux by way of a secondary signal thus obtained. This last point is of particular interest, for example, for increasing the service life of the elementary diodes by setting a maximum authorized emission flux for said elementary diodes with regard to a maximum flux that these are able to emit.
- the control device is configured so as to choose a multiplying coefficient from the database defined above on the basis of a temperature measured by a temperature sensor defined above, and on the basis of a predefined luminous flux to be emitted by the elementary diodes of the pixelated light-emitting diode. As outlined above, it should be noted here that the multiplying coefficient to be applied to the signals driving the emission of luminous fluxes by the elementary diodes may be chosen, for a temperature measured by the temperature sensor outlined above, in relation to a predefined maximum emission flux in order to optimize the service life of the elementary diodes of the pixelated light-emitting diode. According to one example, this multiplying coefficient is that which is applied, by the control device according to the invention, to the signals driving the emission of a luminous flux by each elementary diode of the pixelated light-emitting diode. According to another example, this multiplying coefficient may be applied to the pulse width modulation signals driving the emission of luminous fluxes by one or more predefined groups of elementary diodes, and it may be weighted by one or more predefined factors in order to be applied to the pulse width modulation signals driving the emission of luminous fluxes by other groups of elementary diodes.

The invention thus achieves the aim that it set itself by offering the possibility of regulating a luminous flux emitted by a pixelated light-emitting diode on the basis of the temperature thereof.

According to another aspect, the invention extends to a method for controlling a pixelated light-emitting diode intended to project a predefined image from a motor vehicle, the control method according to the invention comprising at least:

- a first step of measuring a temperature of the pixelated light-emitting diode and/or of one or more elementary diodes thereof,
- a step of defining a multiplying coefficient to be applied to pulse width modulation signals driving the emission of luminous fluxes by elementary diodes of the pixelated light-emitting diode, the multiplying coefficient being defined on the basis of the measured temperature,
- a step of a control device as defined and described above applying the multiplying coefficient to the pulse width modulation signals driving the emission of the luminous fluxes emitted by elementary diodes of the pixelated light-emitting diode.

The invention therefore makes provision for the value of the multiplying coefficient to be dependent on the measured value of the temperature, obtained in the first step of the method according to the invention.

Advantageously, the abovementioned pulse width modulation signals consist of a pulse width modulation drive signal of a common DC supply current to the pixelated light-emitting diode, that is to say a common DC supply current to the set of elementary diodes forming said pixelated light-emitting diode. According to one advantageous but non-exclusive embodiment, the same multiplying coefficient is applied to the pulse width modulation signals driving the emission of the luminous fluxes individually by each elementary diode of the pixelated light-emitting diode.

According to one particularly advantageous feature of the method according to the invention, the step of defining the abovementioned multiplying coefficient is preceded by a preliminary operation of establishing a database of luminous fluxes emitted by the elementary diodes of the pixelated light-emitting diode, for various temperatures thereof, measured by a temperature sensor as outlined above, and for various predefined multiplying coefficients.

More precisely, the invention makes provision, for each elementary diode, and for a predefined common DC supply direct, for a curve of the luminous flux emitted by the elementary diode under consideration to be established on the basis of the temperature, and for such a curve also to be established for various multiplying coefficients applied to the pulse width modulation signal driving the emission of a luminous flux by the elementary diode under consideration. It should therefore be understood here that the various luminous flux curves established for various multiplying coefficients result directly from the curve initially established in the absence of any multiplying coefficient, or, according to another point of view, for a multiplying coefficient equal to 1. In other words, and with reference to the denominations defined above, the abovementioned database comprises, in addition to an initial curve established for a given primary signal, the curves established for a set of secondary signals obtained for various multiplying coefficients.

According to one preferred but non-exclusive embodiment, the elementary diodes forming the pixelated light-emitting diode are all identical, and the database is established for just one of them. According to other examples in which for example the pixelated light-emitting diode is formed from multiple groups of different elementary diodes, such a database may be established for one elementary diode of each group.

According to another feature of the method according to the invention, the step of defining the multiplying coefficient outlined above comprises a preliminary step of defining a luminous flux to be emitted by the elementary diodes of the pixelated light-emitting diode. In other words, the method according to the invention makes provision, based on a temperature measured by the abovementioned temperature sensor, for the multiplying coefficient to be chosen on the basis of a previously defined desired luminous flux. This desired luminous flux may, according to various examples, be defined in terms of absolute value by a number of lumens emitted by one or more elementary diodes of the pixelated light-emitting diode, or it may be defined in terms of relative value, with respect for example to a maximum authorized emission flux for each elementary diode or for the whole pixelated light-emitting diode. This maximum authorized emission flux may for example be defined so as to limit any risk of dazzling other users of the road on which a vehicle equipped with a lighting assembly implementing a control device and a method according to invention is traveling, or it may be defined so as to optimize the service life of the elementary diodes of the pixelated light-emitting diode.

The method according to the invention may also comprise, according to one advantageous embodiment, an additional step of modifying a common DC supply current to the pixelated light-emitting diode on the basis of a temperature thereof. This is of particular interest if the chosen multiplying coefficient adopts extreme low or high values. In the case of a very low multiplying coefficient, it may be advantageous to increase the common DC supply current to the elementary diodes or a group thereof, in order to avoid the emission of luminous fluxes that are too low to be visible in good conditions. Conversely, in the case of a very high multiplying coefficient, it may be advantageous to reduce the common DC supply current to the elementary diodes or a group thereof in order to avoid any luminous saturation thereof, which saturation, on the one hand, could lead to dazzling a road user looking at the image projected by the pixelated light-emitting diode, and, on the other hand, could lead to premature damage to the elementary diodes under consideration.

Through the control device integrated into a lighting assembly as outlined above, and through the control method as has just been described, the invention indeed achieves the aim that it set itself, by proposing to control and drive a pixelated light-emitting diode on the basis of the temperature. In addition, the control device and method according to the invention implement simple and inexpensive means for a low additional cost in a motor vehicle.

The invention lastly extends to a lighting assembly for a motor vehicle, comprising at least one pixelated light-emitting diode intended to project a predefined image from the motor vehicle, and comprising a control device as defined and described above, configured so as to implement the method according to the invention as has just been defined and described.

Figure 2:
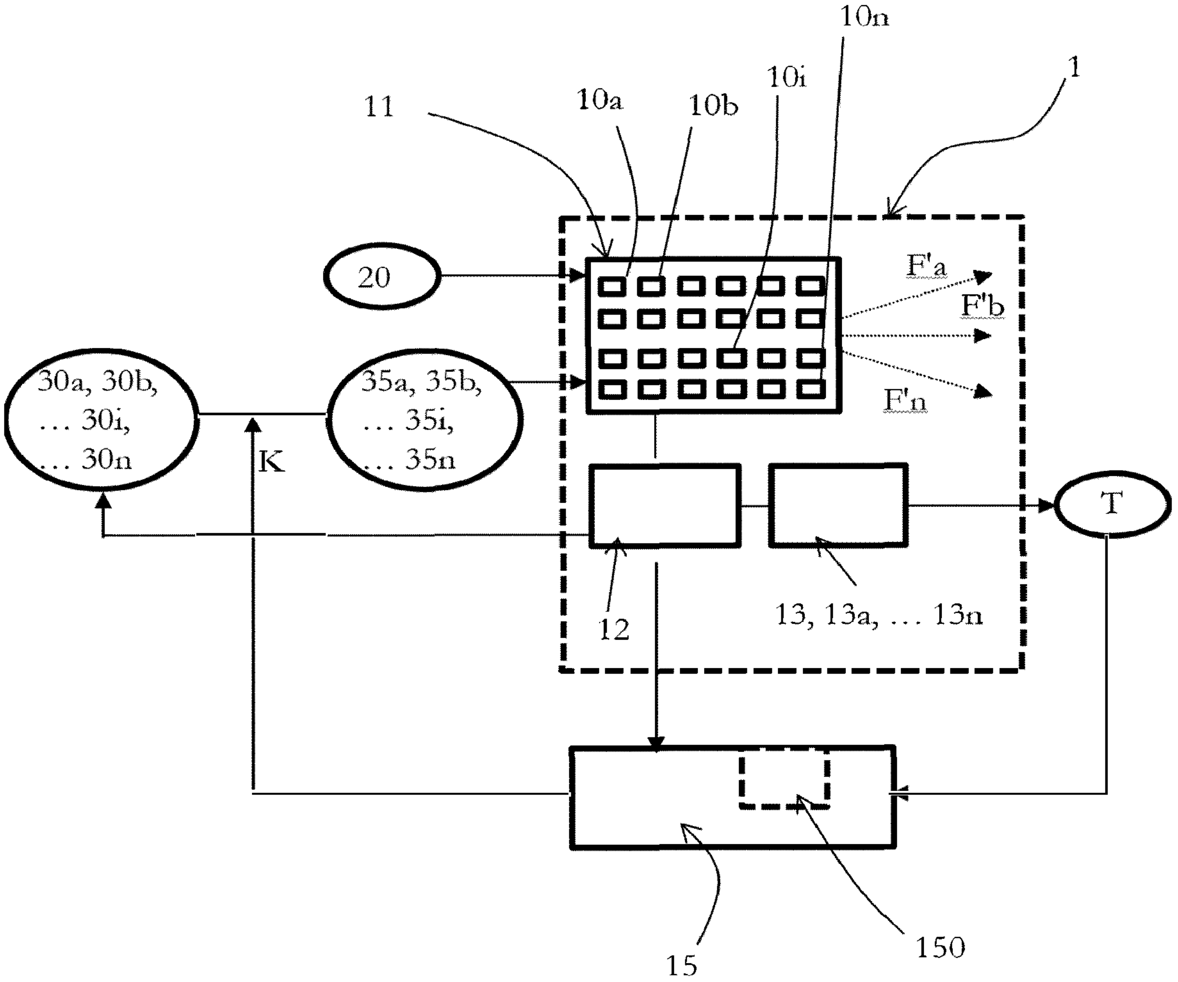
Figure 3:
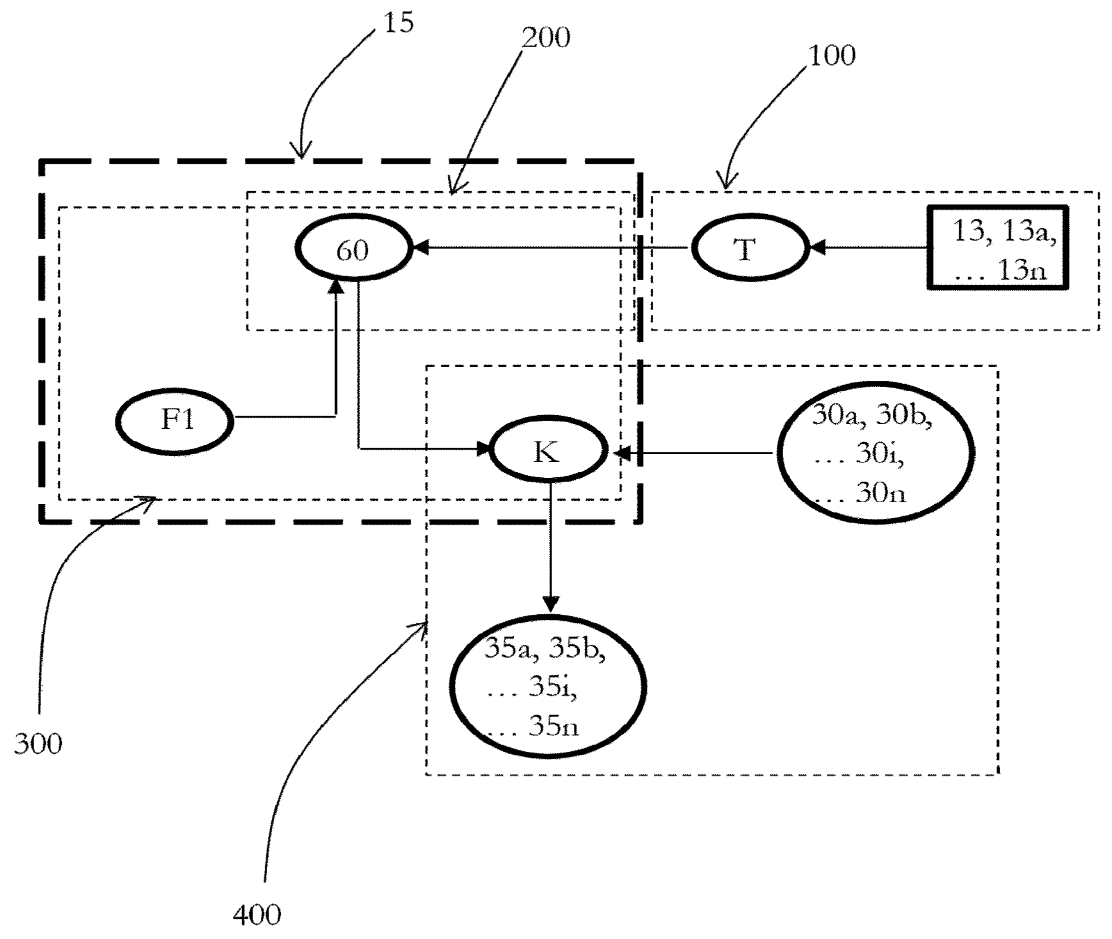
Figure 4A:
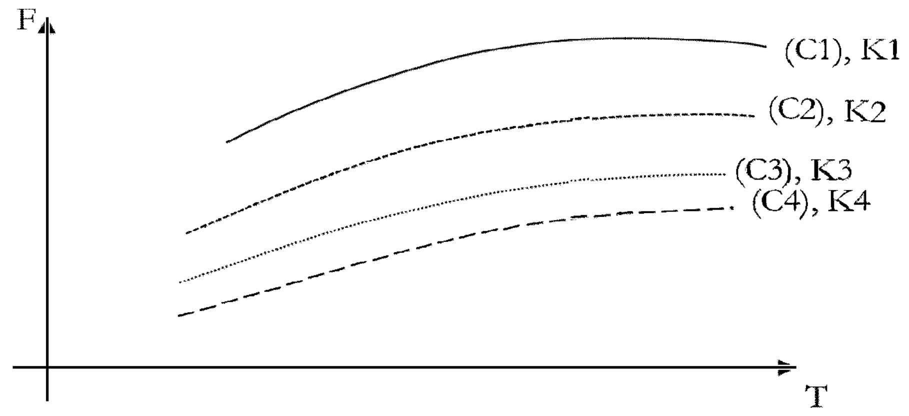
Figure 5B:
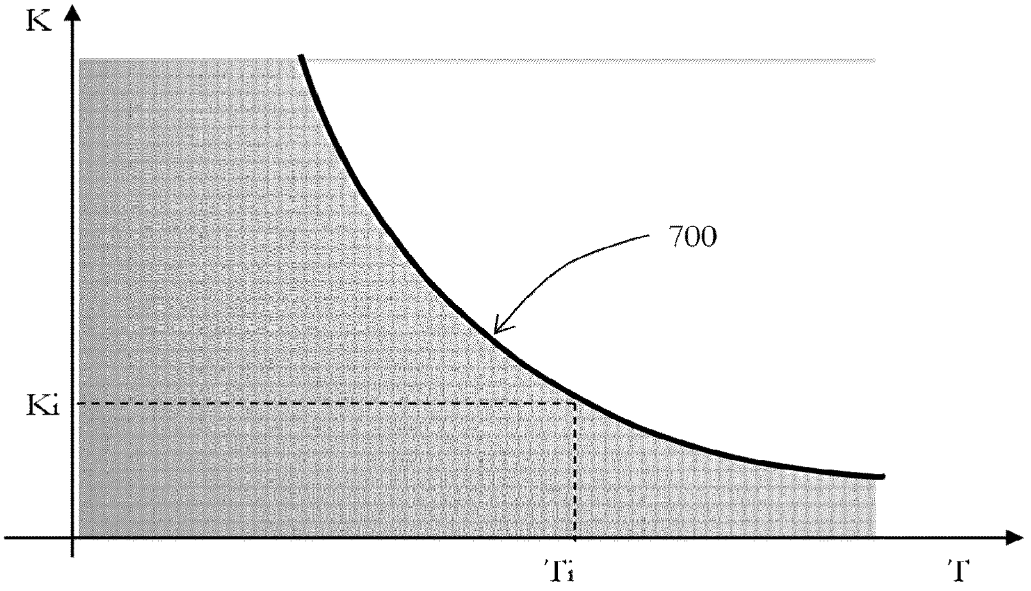
Figure 6:
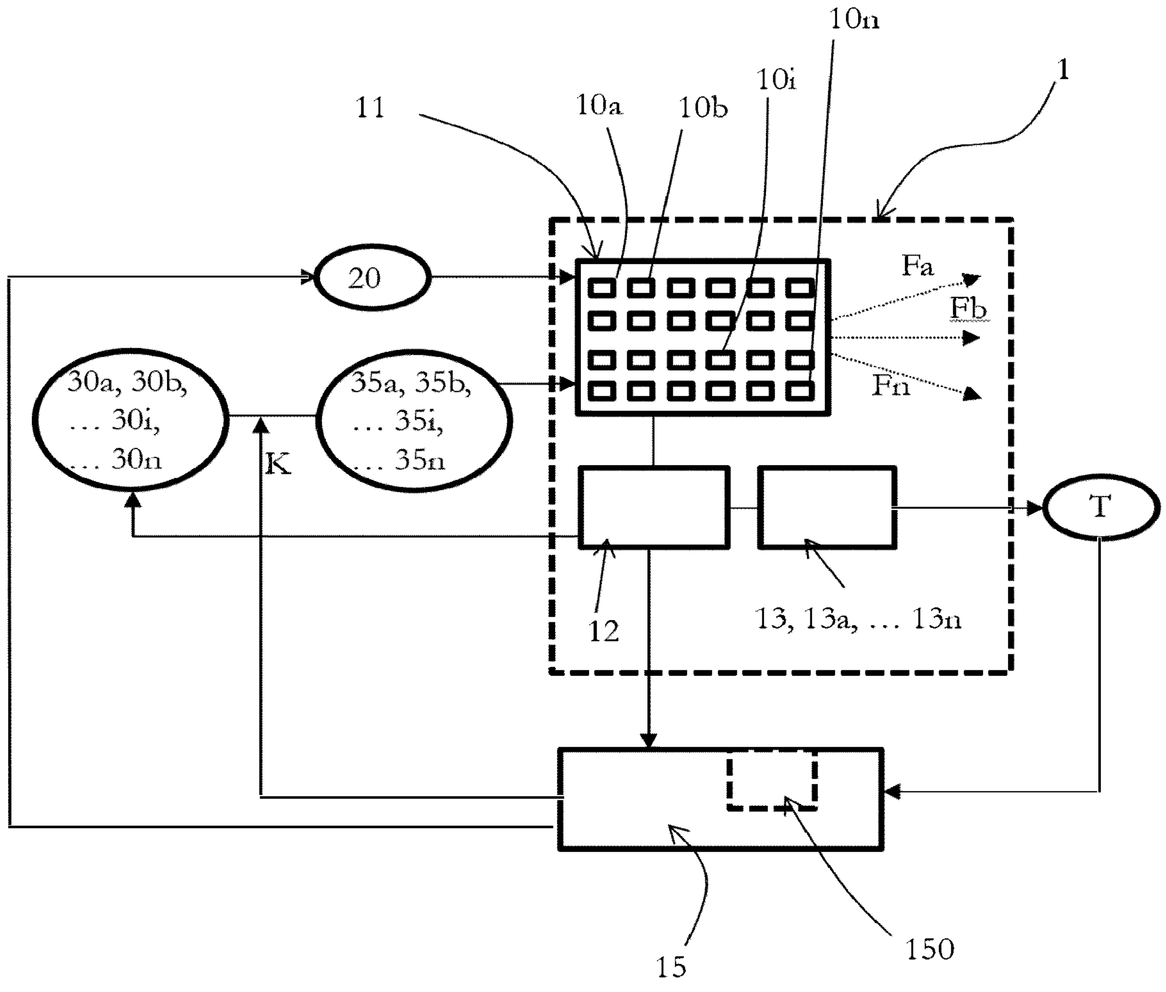

Other features, details and advantages of the invention will become more clearly apparent with the aid of the following description and of the drawings, in which:

FIG. 1 schematically shows the operation of a control device for controlling a pixelated light-emitting diode, as known from the prior art, FIG. 2 schematically shows the operation of a control device for controlling a pixelated light-emitting diode, according to a first embodiment of the invention, FIG. 3 schematically illustrates the sequence of one exemplary implementation of a method according to the invention, FIGS. 4*a* and 4*b* schematically illustrate the operation of establishing a database of luminous fluxes as described above, FIGS. 5*a* and 5*b* schematically illustrate the step of choosing a multiplying coefficient in a database such as the one whose creation is illustrated by FIGS. 4*a* and 4*b*, and FIG. 6 schematically shows the operation of a control device for controlling a pixelated light-emitting diode, according to a second embodiment of the invention.

It should first of all be noted that, although the figures set out the invention in detail for its implementation, they may of course be used to better define the invention if necessary. It should also be noted that, in all of the figures, elements that are similar and/or perform the same function are indicated by the same reference.

FIG. 1 schematically illustrates the operation of a pixelated light-emitting diode and of its control device as known from the prior art.

This figure contains a pixelated light-emitting diode 1 consisting of a plurality of elementary light-emitting diodes 10*a*, 10*b*, . . . 10*i*, . . . 10*n*, supplied by a common DC current 20. The elementary diodes 10*a*, . . . 10*n* are advantageously placed on a support 11, and they are controlled by an associated electronic module. According to the example illustrated by FIG. 1, the electronic control module 12 performs pulse width modulation-based driving of the common DC supply current 20 so as to generate, for each of the elementary diodes 10*a*, . . . 10*i*, . . . 10*n*, an individual signal 30*a*, 30*i*, . . . 30*n* for controlling the emission of a luminous flux Fa, . . . Fi, . . . Fn. The set of individual luminous fluxes Fa, . . . Fn emitted by the elementary diodes 10*a*, . . . 10*n* of the pixelated light-emitting diode 1 forms a luminous image that is projected by the pixelated light-emitting diode 1.

The pixelated light-emitting diode 1 also comprises a temperature sensor 13 configured so as to measure a temperature T of the pixelated light-emitting diode 1 and to transmit this information to a control unit 14 thereof. According to the prior art as illustrated by FIG. 1, the temperature T of the pixelated light-emitting diode 1 is transmitted to the abovementioned control unit 14, which is configured so as to modify the common DC supply current 20 on the basis of this temperature.

Such driving is however relatively inaccurate and exhibits low sensitivity.

FIG. 2 schematically shows the operation of a pixelated light-emitting diode 1 and of its control device according to a first embodiment of the invention.

FIG. 2 contains, shown schematically, the pixelated light-emitting diode 1 and the elementary diodes 10*a*, . . . 10*n* forming it, supplied with a common DC supply current 20. FIG. 2 also contains the support 11 for the elementary diodes 10*a*, . . . 10*n*, and the electronic control module 12 therefor, configured so as to individually generate a primary signal 30*a*, . . . 30*n* for driving each elementary diode 10*a*, . . . 10*n* of the pixelated light-emitting diode 1, the primary signals 30*a*, . . . 30*n* consisting of a pulse width modulation of the common DC supply current 20. Each primary signal 30*i* is thus a pulse width modulation instruction which, in combination with the DC current voltage setpoint, aims to give a supply current appropriate for the elementary diodes.

The pixelated light-emitting diode 1 as illustrated by FIG. 2, according to a first embodiment of the invention, also comprises a temperature sensor 13. According to various examples, the temperature sensor 13 is configured so as to measure an average temperature of the elementary diodes 10*a*, . . . 10*n*, or to measure an average temperature of the support 11 defined above. According to one non-exclusive embodiment, each elementary diode 10*a*, . . . 10*n* is associated with a temperature sensor, respectively 13*a*, . . . 13*n*: placing a temperature sensor as close as possible to each elementary diode 10*a*, . . . 10*n* thus gives more accurate information about the temperature at each point of the pixelated diode 1. As an alternative, when the elementary diodes 10*a*, . . . 10*n* of the pixelated diode 1 are distributed into various groups of elementary diodes, a temperature sensor may be associated with each group of elementary diodes.

With reference to FIG. 2, the pixelated light-emitting diode 1 also comprises a control device 15 configured in particular so as to receive the temperature information T measured by an abovementioned temperature sensor 13, 13*a*, . . . 13*n*. According to the invention, the control device 15 is also configured so as to apply, to the primary pulse width modulation signals 30*a*, . . . 30*n*, a multiplying coefficient K defined beforehand on the basis of the abovementioned temperature T. The secondary signals 35*a*, . . . 35*n* that then individually drive the emission of luminous fluxes F'a, . . . F'n by the elementary diodes 10*a*, . . . 10*n* are therefore, for each of the elementary diodes 10*a*, . . . 10*n*, the product of the primary signal 30*a*, . . . 30*n* defined above, consisting of pulse width modulation-based driving of the common DC supply current 20, and of the abovementioned multiplying coefficient K. It should therefore be noted that, according to this exemplary embodiment, the common DC supply current 20 to the pixelated light-emitting diode 1 is unchanged.

According to the embodiment illustrated more particularly by FIG. 2, which is not exclusive, the same multiplying coefficient K is applied to all of the primary pulse width modulation signals 30*a*, . . . 30*n* that are defined in order to drive the emission of respective luminous fluxes by the elementary diodes 10*a*, . . . 10*n*. According to other embodiments, not shown by the figures, various multiplying coefficients K', K" may be defined beforehand on the basis of the temperature T and applied to various groups of elementary diodes of the pixelated light-emitting diode 1.

By applying the multiplying coefficient K or the multiplying coefficients K', K" outlined above, the invention allows more accurate and sensitive pulse width modulation driving of the individual signals that drive the emission of the luminous fluxes by the elementary diodes 10*a*, . . . 10*n* and, therefore, of the pixelated light-emitting diode 1.

FIG. 3 schematically illustrates one exemplary implementation of the control method according to the invention.

In a first step 100 of this method, a temperature T of the pixelated light-emitting diode 1 is measured by a temperature sensor 13, 13*a*, . . . 13*n* as defined above and transmitted to the control device 15.

In a second step 200 of the method according to the invention, the measured temperature T is transmitted to a database 60 of luminous fluxes Fa, . . . Fn emitted by the elementary diodes 10*a*, . . . 10*n* of the pixelated light-emitting diode 1 at various temperatures and for various values of the multiplying coefficient K, the database 60 being stored in a storage module 150 of the control device 15, outlined schematically in FIG. 2.

In a third step 300 of the method according to the invention, a multiplying coefficient K is chosen, from the database 60, for the measured temperature T, on the basis of a previously determined value of luminous fluxes F1 to be emitted by the elementary diodes 10*a*, . . . 10*n*. According to one example, the luminous flux to be emitted F1 may be chosen with reference to a maximum luminous emission flux Fmax of the elementary diodes 10*a*, . . . 10*n*.

In a fourth step 400 of the method according to the invention, the chosen multiplying coefficient K is applied to the primary signals 30*a*, . . . 30*n* for the pulse width modulation-based driving of the emission of the luminous fluxes by the elementary diodes 10*a*, . . . 10*n* of the pixelated light-emitting diode 1. This results in the application, to the elementary diodes 10*a*, . . . 10*n*, of previously defined secondary signals 35*a*, . . . 35*n* for the pulse width modulation-based driving of the emission of luminous fluxes.

FIGS. 4*a*, 4*b*, 5*a* and 5*b* more precisely illustrate the steps of defining the database 60 defined above and of choosing the multiplying coefficient K.

FIGS. 4*a* and 4*b* more particularly illustrate the operation of defining the database 60. In FIG. 4*a*, the temperature T, for example a temperature T measured by a temperature sensor 13, 13*a*, . . . 13*n*, as defined above, is plotted on the abscissa, and the luminous flux F emitted by an elementary diode 10*a*, 10*b*, . . . 10*n* of a pixelated light-emitting diode 1 is plotted on the ordinate. The curves (C1), (C2), (C3), (C4) shown in this figure illustrate the variation of the luminous flux F emitted by such an elementary diode as a function of the temperature T, for various values of the multiplying coefficient K defined above, respectively K1, K2, K3, K4. According to one example, the luminous flux F plotted on the ordinate of the curves illustrated by FIG. 4 is measured in terms of absolute value and expressed in lumens. Preferably, but not exclusively, the luminous flux F plotted on the ordinate of the curves illustrated by FIG. 4*a* is normalized, that is to say that it is a relative luminous flux or, in other words, a value of the luminous flux emitted by the elementary diode under consideration, reduced for example to a maximum flux emitted by this elementary diode.

FIG. 4*b* combines all of the curves illustrated by FIG. 4*a* in a single three-dimensional graph. The following are thus plotted in this FIG. 4*b*, respectively:

- along an axis X of an orthonormal reference system (X, Y, Z), the temperature T of an elementary diode 10*a*, . . . 10*n* of a pixelated light-emitting diode 1,
- along an axis Y of the abovementioned orthonormal reference system, the multiplying coefficient K as defined above,
- and along an axis Z of the abovementioned orthonormal reference system, the luminous flux F emitted by the elementary diode 10*a*, . . . 10*n* under consideration.

The set of curves obtained in FIG. 4*a* and plotted here on a three-dimensional representation contributes to forming an emission surface 500 of the elementary diode under consideration on the basis firstly of a temperature of the pixelated light-emitting diode 1 to which it belongs and secondly of various values of the multiplying coefficient K defined above. It should be noted that such a graph may be established for each elementary diode 10*a*, . . . 10*n* of the pixelated light-emitting diode 1. According to one example in which the elementary diodes 10*a*, . . . 10*n* are all substantially identical, a graph such as that illustrated by FIG. 4*b* may be established in a manner common to each of these elementary diodes.

FIGS. 5*a* and 5*b* illustrate the process of choosing the multiplying coefficient K to be applied on the basis of the temperature value measured at a given time. As outlined above, the multiplying coefficient K is chosen, for a given temperature T of the pixelated light-emitting diode 1, on the basis of a luminous flux F1 to be emitted by the elementary diodes 10*a*, . . . 10*n* forming it. With reference to FIG. 5*a*, the multiplying coefficient K is therefore chosen within the intersection of the emission surface 500 defined above with a plane 600 parallel to the plane (XY) of the orthonormal reference system (X, Y, Z) defined above, with the ordinate F1 along the axis Z of this same reference system. As indicated above, the luminous flux F1 is preferably, but not exclusively, defined in terms of relative value, with respect for example to a maximum flux emitted by the elementary diode under consideration. As outlined above, this makes it possible in particular to increase the service life of the elementary diodes, by choosing for example to set the luminous flux F1 to a predefined percentage of the maximum luminous flux that they are able to emit, for example 60%.

FIG. 5*b* shows the intersection curve 700 of the plane 600 and of the surface 500 mentioned above.

In this figure, the temperature T of the pixelated light-emitting diode 1 is plotted on the abscissa, and the multiplying coefficient K is plotted on the ordinate. As shown in FIG. 5*b*, the multiplying coefficient K decreases when the temperature T increases. Moreover, it results from the trend of the curve 700 that, for each value Ti of the temperature of the pixelated light-emitting diode 1, measured by a temperature sensor 13, 13*a*, . . . 13*n*, as defined above, on the abovementioned curve 700, there is a corresponding single value Ki of the multiplying coefficient K, which thus defines, for the given emitted luminous flux F1, the value of the multiplying coefficient to be applied to the pulse width modulation signals driving the emission of luminous fluxes by the elementary diodes 10*a*, . . . 10*n* for the temperature Ti of the pixelated light-emitting diode 1 measured by a temperature sensor 13, 13*a*, . . . 13*n*.

It should be understood here that, with the luminous flux emitted individually by each elementary diode 10*a*, . . . 10*n* being defined on the basis of the image to be projected by the whole pixelated light-emitting diode 1, applying the multiplying coefficient K to each of the signals 30*a*, . . . 30*n* that individually drive the emission of luminous fluxes by each elementary diode 10*a*, . . . 10*n* makes it possible to preserve the overall image projected by the pixelated light-emitting diode 1, insofar as it makes it possible to preserve the proportions of the luminous fluxes emitted by each elementary diode 10*a*, . . . 10*n* with respect to the luminous fluxes emitted by the other elementary diodes of the pixelated light-emitting diode 1.

It should be noted that the multiplying coefficient K may be less than or greater than 1. More precisely, a value less than 1 of the multiplying coefficient K is representative of a situation in which, for a given temperature, the emission of the luminous flux F1 by the elementary diode 10*a*, . . . 10*n* under consideration requires the application, to the elementary diode under consideration, of a secondary pulse width modulation signal 35*a*, . . . 35*n* with a value lower than that of the primary pulse width modulation signal 30*a*, . . . 30*n* applied to this same diode at a standard temperature in order to obtain the same luminous flux F1. This is in particular the case when the temperature of the pixelated light-emitting diode 1 increases, as shown by the curve 700 in FIG. 5*b*, the rise in temperature of the light-emitting diodes increasing the intensity value of the luminous flux emitted by these diodes.

Conversely, a value of the multiplying coefficient K greater than 1 is representative of a situation in which, for a given temperature, the emission of the luminous flux F1 by the elementary diode 10*a*, . . . 10*n* under consideration requires the application, to said elementary diode, of a secondary signal 35*a*, . . . 35*n* with a value greater than that of the primary signal 30*a*, . . . 30*n* applied to this same diode at a standard temperature in order to obtain the same luminous flux F1. This is in particular the case when the temperature of the pixelated light-emitting diode 1 decreases, as shown by the curve 700 in FIG. 5*b*.

According to the exemplary embodiment illustrated by FIGS. 2 to 5*b*, the invention regulates the luminous flux emitted by the pixelated light-emitting diode 1 by applying the multiplying coefficient K defined above to at least one of the primary signals 30*a*, . . . 30*n*, so as to transform these one or more primary signals into secondary signals 35*a*, . . . 35*n* that modulate the intensity of the common DC supply current 20 in order to appropriately drive the emission of luminous fluxes by the elementary diodes 10*a*, 10*n* of the pixelated light-emitting diode 1, all other operating parameters of the pixelated light-emitting diode 1 moreover remaining identical.

FIG. 6 illustrates a second embodiment of the invention, in which the method for regulating the luminous flux emitted by the pixelated light-emitting diode 1 on the basis of the temperature comprises an additional step of modifying the common DC supply current 20 thereto. This is of particular interest in particular if the multiplying coefficient K is very low or, conversely, if the multiplying coefficient K is greater than 1.

When the coefficient K is much greater than 1, that is to say, with reference to the above, when the temperature of the pixelated light-emitting diode 1 is low, it may be beneficial to reduce the DC supply current 20: this makes it possible to limit the risks of saturation resulting from obtaining a very large secondary signal by applying the very high coefficient K.

According to other examples, if the multiplying coefficient K is high, it may be beneficial to increase the DC supply current 20, in particular if the image projected by the pixelated light-emitting diode 1 has regions of strong contrast. In this case, an increase in the common DC supply current 20, leading to an increase in the temperature of the pixelated light-emitting diode 1, will lead to the choice, for a luminous flux F1 defined beforehand, of a multiplying coefficient less than the initial multiplying coefficient K, thus limiting the risks of loss of contrast from one pixel to another.

If the multiplying coefficient K has a value much lower than 1, that is to say, with reference to the above, if the temperature of the pixelated light-emitting diode 1 is high, it may be beneficial to increase the voltage of the previously defined common DC supply current 20 in order to avoid the occurrence of excessively dark areas in the projected image, which excessively dark areas result from the application of a secondary signal that is excessively low due to the low value of the multiplying coefficient K.

The invention as has just been described therefore makes it possible, through simple means, to implement simple and inexpensive regulation of the luminous flux emitted by a pixelated light-emitting diode 1 on the basis of the temperature thereof.

However, the invention is not limited to the means and configurations described and illustrated, and it also applies to any equivalent means or configurations and to any combination of such means. In particular, the invention is applicable regardless of the type of elementary diodes 10*a*, . . . 10*n* forming the pixelated light-emitting diode 1, whether these are all identical or whether these are distributed into multiple groups of elementary diodes of different types. In this case, multiplying coefficients K', K", . . . could be defined for each group of elementary diodes. It is likewise feasible, without impacting the invention, to assign the multiplying coefficient K a predefined weighting factor for some elementary diodes 10*i*, . . . 10*n* of the pixelated light-emitting diode 1, on the basis of the region of the image projected thereby associated with the emission of the elementary diodes 10*i*, . . . 10*n* under consideration. This is of particular interest if the image projected by the pixelated light-emitting diode 1 exhibits regions of strong contrast, without it then being necessary to modify the common DC supply current 20 as outlined above.

The invention claimed is:

1. A motor vehicle lighting assembly comprising a pixelated light-emitting diode intended to project a predefined image from a motor vehicle, and a control device for controlling said pixelated light-emitting diode, the pixelated light-emitting diode comprising a plurality of elementary diodes supplied by a common DC current and respectively driven by a pulse width modulation signal of the common DC supply current, the pixelated light-emitting diode comprising a temperature sensor, and the control device being configured so as to modify the pulse width modulation signal on the basis of a temperature of the pixelated light-emitting diode and/or of one or more elementary diodes, wherein the lighting assembly is configured to apply a predefined multiplying coefficient to the pulse width modulation signals individually driving the emission of luminous fluxes by each elementary diode, and wherein the lighting assembly comprises a storage module for storing a database of luminous fluxes emitted by the elementary diodes of the pixelated light-emitting diode at various temperatures, for various multiplying coefficients.

2. The lighting assembly as claimed in claim 1, wherein it is configured so as to choose a multiplying coefficient from the database on the basis of a temperature measured by the temperature sensor and on the basis of a predefined luminous flux to be emitted by the elementary diodes of the pixelated light-emitting diode.

3. A method for controlling a pixelated light-emitting diode intended to project a predefined image from a motor vehicle, the control method comprising at least:

a first step of measuring a temperature of the pixelated light-emitting diode and/or of one or more elementary diodes thereof, a step of defining a multiplying coefficient to be applied to pulse width modulation signals driving the emission of luminous fluxes by elementary diodes of the pixelated light-emitting diode, the multiplying coefficient being defined on the basis of the measured temperature, a step of a control device as claimed in claim 1 applying the multiplying coefficient to the pulse width modulation signals driving the emission of the luminous fluxes by elementary diodes of the pixelated light-emitting diode.

4. A method for controlling a pixelated light-emitting diode intended to project a predefined image from a motor vehicle, the control method comprising at least:

a first step of measuring a temperature of the pixelated light-emitting diode and/or of one or more elementary diodes thereof, a step of defining a multiplying coefficient to be applied to pulse width modulation signals driving the emission of luminous fluxes by elementary diodes of the pixelated light-emitting diode, the multiplying coefficient being defined on the basis of the measured temperature, a step of a control device as claimed in claim 2 applying the multiplying coefficient to the pulse width modulation signals driving the emission of the luminous fluxes by elementary diodes of the pixelated light-emitting diode.

5. A method for controlling a pixelated light-emitting diode intended to project a predefined image from a motor vehicle, the control method comprising at least:

a first step of measuring a temperature of the pixelated light-emitting diode and/or of one or more elementary diodes thereof;

a step of defining a multiplying coefficient to be applied to pulse width modulation signals;

driving the emission of luminous fluxes by elementary diodes of the pixelated light-emitting diode, the multiplying coefficient being defined on the basis of the measured temperature; and a step of providing a control device for controlling said pixelated light-emitting diode, the pixelated light-emitting diode comprising a plurality of elementary diodes supplied by a common DC current and respectively driven by a pulse width modulation signal of the common DC supply current, the pixelated light-emitting diode comprising a temperature sensor, and the control device being configured so as to modify the pulse width modulation signal on the basis of the temperature of the pixelated light-emitting diode and/or of one or more elementary diodes, wherein:

the control device applies the multiplying coefficient to the pulse width modulation signals driving the emission of the luminous fluxes by elementary diodes of the pixelated light-emitting diode, and the step of defining the multiplying coefficient is preceded by a preliminary operation of establishing a database of luminous fluxes emitted by the elementary diodes of the pixelated light-emitting diode for various predefined multiplying coefficients and for various temperatures of the pixelated light-emitting diode, measured by a temperature sensor thereof.

6. The method as claimed in claim 5, wherein the step of defining the multiplying coefficient comprises a preliminary step of defining a luminous flux to be emitted by the elementary diodes of the pixelated light-emitting diode.

7. The method as claimed in claim 6, wherein it comprises an additional step of modifying a common DC supply current to the pixelated light-emitting diode on the basis of a temperature thereof.

8. A lighting assembly for a motor vehicle, comprising at least one pixelated light-emitting diode intended to project a predefined image from the motor vehicle, wherein it comprises a control device configured so as to implement a method as claimed in claim 7.

9. A lighting assembly for a motor vehicle, comprising at least one pixelated light-emitting diode intended to project a predefined image from the motor vehicle, wherein it comprises a control device configured so as to implement a method as claimed in claim 6.

10. A lighting assembly for a motor vehicle, comprising at least one pixelated light-emitting diode intended to project a predefined image from the motor vehicle, wherein it comprises a control device configured so as to implement a method as claimed in claim 5.

11. A lighting assembly for a motor vehicle, comprising at least one pixelated light-emitting diode intended to project a predefined image from the motor vehicle, wherein it comprises a control device configured so as to implement a method as claimed in claim 5.

12. A motor vehicle lighting assembly comprising a pixelated light-emitting diode intended to project a predefined image from a motor vehicle, and a control device for controlling said pixelated light-emitting diode, the pixelated light-emitting diode comprising a plurality of elementary diodes supplied by a common DC current and respectively driven by a pulse width modulation signal of the common DC supply current, the pixelated light-emitting diode comprising a plurality of temperature sensors each having an associated elementary diode or group of elementary diodes, the control device being configured so as to modify the pulse width modulation signal corresponding to said elementary diode or to the group of elementary diodes on the basis of the temperature measured by the corresponding temperature sensor, wherein it is configured so as to apply a predefined multiplying coefficient to the pulse width modulation signals individually driving the emission of luminous fluxes by each elementary diode wherein it comprises a storage module for storing a database of luminous fluxes emitted by the elementary diodes of the pixelated light-emitting diode at various temperatures, for various multiplying coefficients.

13. A method for controlling a pixelated light-emitting diode intended to project a predefined image from a motor vehicle, the control method comprising at least:

a first step of measuring a temperature of the pixelated light-emitting diode and/or of one or more elementary diodes thereof, a step of defining a multiplying coefficient to be applied to pulse width modulation signals driving the emission of luminous fluxes by elementary diodes of the pixelated light-emitting diode, the multiplying coefficient being defined on the basis of the measured temperature, a step of a control device as claimed in claim 12 applying the multiplying coefficient to the pulse width modulation signals driving the emission of the luminous fluxes by elementary diodes of the pixelated light-emitting diode.

14. The lighting assembly as claimed in claim 12, wherein it is configured so as to apply a predefined multiplying coefficient to the pulse width modulation signals individually driving the emission of luminous fluxes by each elementary diode.

15. A method for controlling a pixelated light-emitting diode intended to project a predefined image from a motor vehicle, the control method comprising at least:

a first step of measuring a temperature of the pixelated light-emitting diode and/or of one or more elementary diodes thereof, a step of defining a multiplying coefficient to be applied to pulse width modulation signals driving the emission of luminous fluxes by elementary diodes of the pixelated light-emitting diode, the multiplying coefficient being defined on the basis of the measured temperature, a step of a control device as claimed in claim 12 applying the multiplying coefficient to the pulse width modulation signals driving the emission of the luminous fluxes by elementary diodes of the pixelated light-emitting diode.

* * * * *